US012009118B2

United States Patent
Allen et al.

(10) Patent No.: US 12,009,118 B2
(45) Date of Patent: Jun. 11, 2024

(54) APPARATUS FOR APPLYING A SLEEVE TO A CABLE AND METHOD OF INSERTION INTO A CONDUIT

(71) Applicant: WESCO Distribution, Inc., Pittsburgh, PA (US)

(72) Inventors: Jerry L. Allen, Sarasota, FL (US); Steven L. Bedingfield, LaGrange, GA (US)

(73) Assignee: Wesco Distribution, Inc., Pittsburgh, PA (US)

( * ) Notice: Subject to any disclaimer, the term of this patent is extended or adjusted under 35 U.S.C. 154(b) by 92 days.

(21) Appl. No.: 17/475,693

(22) Filed: Sep. 15, 2021

(65) Prior Publication Data

US 2023/0077480 A1    Mar. 16, 2023

(51) Int. Cl.
*H01B 13/26*    (2006.01)
*H01B 13/34*    (2006.01)
(Continued)

(52) U.S. Cl.
CPC ......... *H01B 13/268* (2013.01); *H01B 13/344* (2013.01); *H01B 13/004* (2013.01);
(Continued)

(58) Field of Classification Search
CPC .... H01B 13/004; H01B 13/18; H01B 13/268; H01B 13/342; H01B 13/344; H01B 13/10;
(Continued)

(56) References Cited

U.S. PATENT DOCUMENTS 3,753,279 A * 8/1973 Eppler ............. Y10T 29/53235
                                                     29/56.6
4,270,963 A    6/1981 Howat
(Continued)

FOREIGN PATENT DOCUMENTS

GB         1534279 A      11/1978
JP    2020092063 A  *  6/2020  ............. F27B 7/383

OTHER PUBLICATIONS

Muto et al, "Development of cold-shrinkable joints with silicone rubber sleeve for 110-230 kV XLPE cables," IEEE/PES Transmission and Distribution Conference and Exhibition, Yokohama, Japan, 2002, pp. 1077-1082 vol. 2. (Year: 2002).*

(Continued)

*Primary Examiner* — A. Dexter Tugbang
(74) *Attorney, Agent, or Firm* — Renner, Kenner, Greive, Bobak, Taylor & Weber Co., LPA

(57) ABSTRACT

A fabric sleeve in the form of a strip of material having compatible attachment members along its lateral edges, is applied to a cable by a device located at a site where the cable can be introduced into a conduit. The device includes a beam carried by a post. The beam carries a plurality of formers which receive the sleeve and the cable from rolls and which progressively fold the sleeve around the cable. The beam also carries an attachment device which receives the sleeve and cable from the formers and which connects the attachment members of the sleeve to confine the cable therein. The attachment device can be opened so that the sleeved cable can be removed. The device is operated at the site until the sleeved cable reaches a downstream installation site and the process is repeated at that downstream site.

13 Claims, 13 Drawing Sheets

(51) Int. Cl.
  *H02G 1/08*    (2006.01)
  *H01B 13/004*  (2006.01)
  *H01B 13/10*   (2006.01)
  *H01R 43/16*   (2006.01)
  *H01R 43/28*   (2006.01)

(52) U.S. Cl.
  CPC .......... *H01B 13/103* (2013.01); *H01B 13/342* (2013.01); *H01R 43/16* (2013.01); *H01R 43/28* (2013.01); *H02G 1/08* (2013.01); *Y10T 29/53213* (2015.01)

(58) Field of Classification Search
  CPC ..... H01B 13/103; H01B 7/1805; Y10T 29/49; Y10T 29/123; Y10T 29/53213; Y10T 29/53235; H01R 43/16; H01R 43/28; H02G 1/08
  See application file for complete search history.

(56) References Cited

U.S. PATENT DOCUMENTS

| | | | | |
|---|---|---|---|---|
| 4,415,223 | A * | 11/1983 | Asick | Y10T 29/53235 439/879 |
| 9,054,507 | B2 * | 6/2015 | Allen | H01B 7/1805 |
| 2015/0090388 | A1 | 4/2015 | Suzuki | |
| 2020/0235554 | A1 | 7/2020 | Allen | |

OTHER PUBLICATIONS

Extended European Search Report for European Patent Application No. 22194727.8, dated Jan. 27, 2023.

* cited by examiner

APPARATUS FOR APPLYING A SLEEVE TO A CABLE AND METHOD OF INSERTION INTO A CONDUIT

TECHNICAL FIELD

This invention relates to a device which applies a sleeve to a communications cable. More particularly, this invention relates to a device which can be utilized at the site where the cable is introduced into an underground conduit.

BACKGROUND ART

Positioning cables in underground communication conduits which extend for several thousand feet has long been a problem. Such is particularly true when it is desired to position an additional cable or cables into a conduit that already has a cable in it. That cable, particularly because of its plastic jacket, provides a great deal of friction to the new cable as it is being inserted into the conduit. As a result, the new or the existing cable may be damaged due to that friction. Such is particularly true when the cable in the conduit is undulating which causes the cable being introduced to take a sinuous, friction-laden path.

An extremely successful solution to this problem is a fabric innerduct sold under the trademark MAXCELL® by WESCO Distribution, Inc. of Pittsburgh, Pennsylvania and shown in U.S. Pat. No. 6,262,371 which is incorporated herein by reference for whatever details may be necessary to understand the present invention. This innerduct can be first positioned in a conduit to divide the conduit into longitudinally extending compartments. A cable can be positioned in one of the compartments, and a pull tape or rope can be positioned in another compartment which can later be utilized to pull a second cable into that compartment. Because there is fabric between the cables, the friction is not on the cable jacket but on the fabric which makes installation easier.

While such provides an extremely efficient solution to the problem, its use is a two-step operation. That is, first the innerduct is installed in the conduit and then a cable is inserted into the innerduct. As a result, a system was designed whereby a fabric sleeve, having a coefficient of frictionless than that of a cable, is provided around the sleeve and then, in a one-step process, the cable with the sleeve on it can be inserted into a conduit. Such a system is described, for example, in U.S. Pat. No. 10,937,568 which is incorporated herein by reference for whatever details are necessary to understand the present invention.

That patent contemplates that the sleeve could be attached to the cable while the cable is being introduced into an underground conduit. The present invention relates to a device which accomplishes that function.

DISCLOSURE OF THE INVENTION

It is thus an object of one aspect of the present invention to provide a device which applies a sleeve to a cable.

It is an object of another aspect of the present invention to provide a device, as above, which applies the sleeve to the cable as the cable is being introduced into a conduit.

It is an object of an additional aspect of the present invention to provide a device, as above, which receives the cable from a roll of cable, and receives the sleeve from a roll of the sleeve, and automatically aligns the sleeve around the cable and provides a sealing mechanism to lock the sleeve on to the cable.

It is an object of a further aspect of the invention to provide a method of inserting a sleeved cable into a conduit.

These and other objects of the present invention, as well as the advantages thereof over existing prior art forms, which will become apparent from the description to follow, are accomplished by the improvements hereinafter described and claimed.

In general, a sleeve in the form of a strip of material having compatible attachment members along its lateral edges is applied around a cable by an apparatus which includes a post, and a beam carried by the post. A plurality of formers are carried at spaced locations along the beam. The formers receive the cable and the sleeve and fold the sleeve around the cable. An attachment device which is carried by the beam receives the sleeve and the cable from the formers and connects the attachment members so that the sleeve is applied to the cable.

In accordance with another aspect of the invention, a sleeve of material is applied around a cable by an apparatus which includes a beam. First and second formers are spaced along the beam, each former receiving the cable and the sleeve. The sleeve is received in an arcuate slot provided in each former. The radius of curvature of the slot in the first former is larger than the radius of curvature of the slot in the second former so that the sleeve is being wrapped around the cable as the sleeve and the cable move along the beam.

In accordance with another aspect of the invention, a sleeve in the form of a strip of material having compatible attachment members along its lateral edges is applied around a cable by an apparatus which includes a beam. A plurality of formers are carried by the beam, the formers receiving the cable and the sleeve and folding the sleeve around the cable. An attachment device receives the cable and the sleeve from the formers and incudes two plates joined by a hinge. When the plates are closed against each other, the attachment members are connected to each other, and when the plates are rotated on the hinge to an open position, the cable having the sleeve applied thereto may be removed from the apparatus.

The invention also includes a method of creating a cable with a sleeve around it, and installing the sleeved cable into a conduit at a plurality of spaced installation sites. The cable and sleeve are fed into a device which applies the sleeve to the cable. The sleeved cable is introduced into a conduit which is accessed at a first installation site. The sleeved cable is transferred through the conduit to a second installation site. When the sleeved cable reaches the second installation site, the sleeved cable is removed from the device and the sleeve is cut to form a first portion of a sleeved cable between the first and second installation sites. At the second installation site, the cable and a sleeve are fed into a device which applies the sleeve to the cable. The sleeved cable is then transferred form the second installation site through the conduit toward the next installation site to ultimately form a second portion of sleeved conduit between the second and the next installation site.

A preferred exemplary embodiment of a device for applying a sleeve to a cable according to the concepts of the present invention is shown by way of example in the accompanying drawings without attempting to show all of the various forms and modifications in which the invention might be embodied, the invention being measured by the appended claims and not by the details of the specification.

PREFERRED EMBODIMENT FOR CARRYING OUT THE INVENTION

Figure 1:
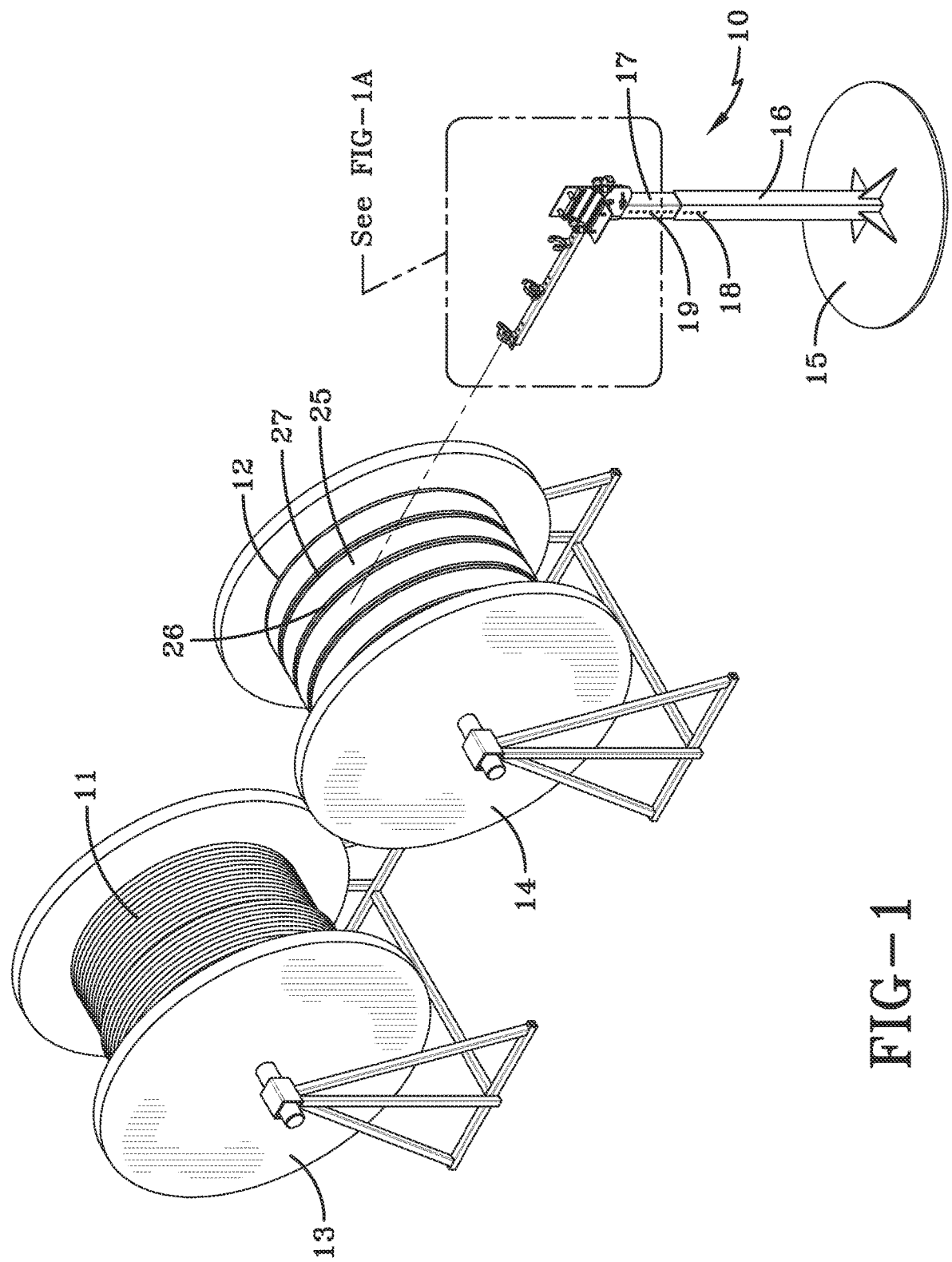
FIG. 1 is a perspective view of the device of the present invention shown in the environment of a site where a cable, to be covered with a sleeve, is to be inserted into an underground conduit.

A device made in accordance with the present invention is generally indicated by the numeral 10, and is depicted at the site where a cable 11 is introduced into an underground conduit. Device 10 applies a sleeve 12 to the cable 11 and together they are introduced into a conduit. A supply of cable 11 is carried by a conventional reel 13, and a supply of the sleeve 12 is carried by a conventional reel 14. Sleeve 12 may be made of any suitable material, preferably a fabric material, which has a coefficient of friction less than that of the cable so that a sleeved cable can be more easily instead into a conduit than a bare cable. As is known in the art, reel 13 and reel 14 can carry one or more thousand feet of cable 11 and sleeve 12 for introduction into the conduit.

Device 10 includes a stand 15 that can be positioned on the ground. Stand 15 carries a tube 16 which receives a post 17. Tube 16 is provided with a plurality of apertures 18, and post 17 is provided with a plurality of apertures 19. An aperture 18 can be aligned with an aperture 19 and a pin (not shown) or other device is provided through the apertures. As such, the height of device 10 can be adjusted.

Figure 4:
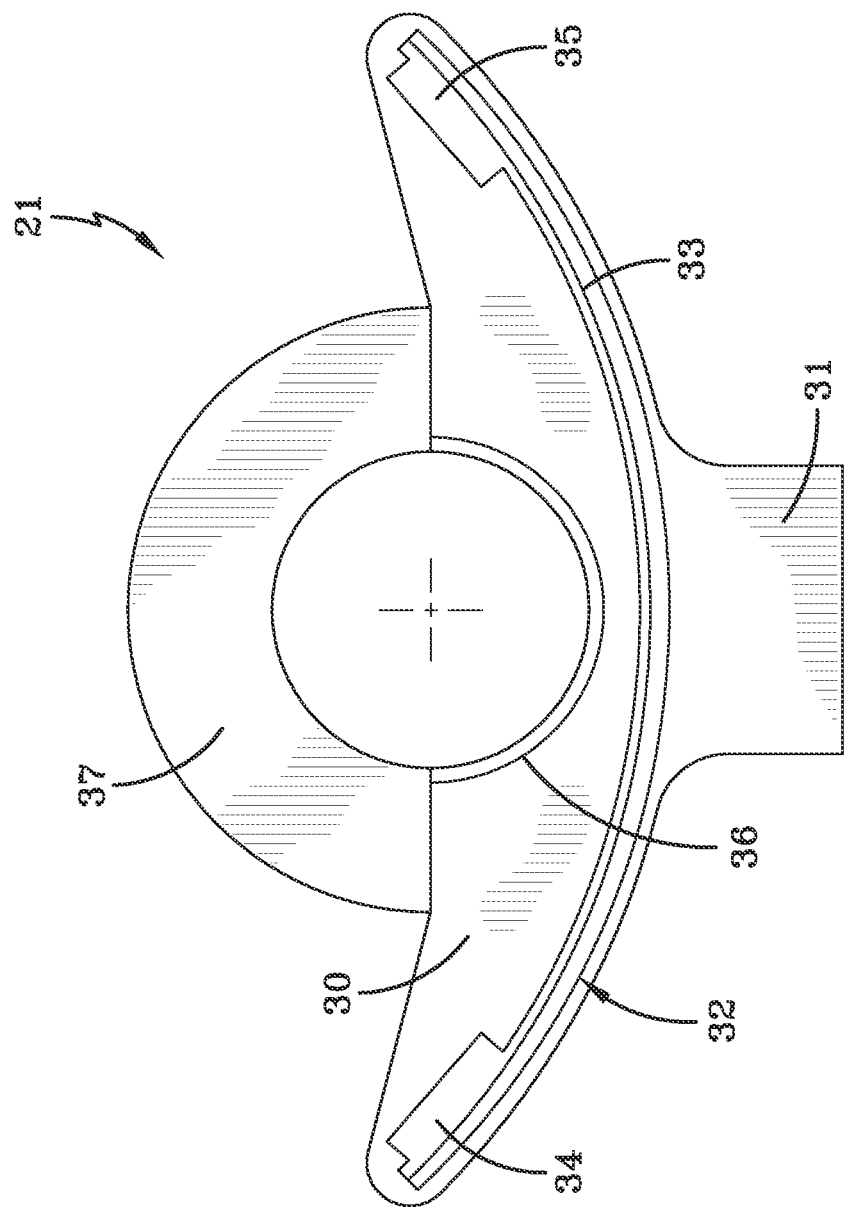
FIG. 4 is an elevational view of the first former which receives the sleeve.
Figure 5:
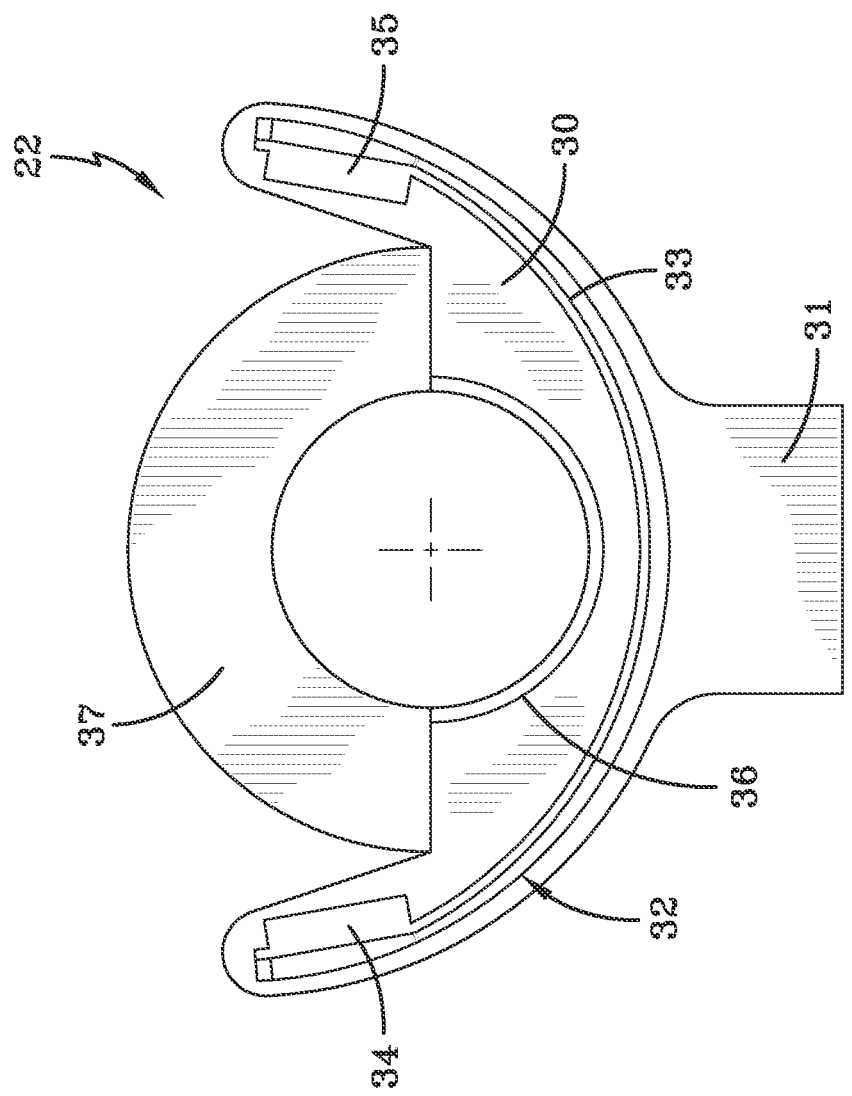
FIG. 5 is an elevational view of the second former which receives the sleeve.

Post 17 carries the main beam 20 of the device such that beam 20 extends generally laterally from post 17. Beam 20 carries a plurality of former assemblies, a first former being generally indicated by the numeral 21 and shown in FIG. 4, a second former being generally indicated by the numeral 22 and shown in FIG. 5, and a third former being generally indicated by the numeral 23 and shown in FIG. 6. Formers 21, 22 and 23 may be selectively positioned, as desired, along the beam 20, by being bolted or otherwise attached through selected holes 24 in beam 20. Formers 21, 22- and 23-fold sleeve 12 around cable 11 in a manner to be hereinafter described.

Sleeve 12 is in the form of a strip of material 25 having opposed compatible attachment members 26, 27 formed at the lateral edges of the strip of material 25 as by stitching. The overall width of the sleeve 12 is preferably slightly larger than the circumference of the cable 11 that is selected for insertion. As a result, sleeve 12 surrounds cable 11, but cable 11 may be pulled through sleeve 12 as may be necessary as will hereafter be described. Attachment members 26, 27 are preferably, respectively, the hook and loop components of VELCO® attachment system, but could include other attachment devices such as an adhesive or the like.

Each former 21, 22, and 23 includes a generally crescent shaped body 30 integrally carried by a hub 31 which provides the means to be connected to body 20. A slot, generally indicated by the numeral 32, is formed in body 30. Slot 32 includes an arcuate portion 33 and enlarged portions 34 and 35 at the ends of arcuate portion 33. The sleeve 12 is received in slot 32 with the strip of material 25 being received in arcuate portion 33 and the attachment members 26, 27 being received in enlarged slot portions 34 and 35, respectively.

The top center of body 30 is provided with an arcuate recess 36 which is adapted to receive the cable 11. As shown in FIG. 1B, a cover 37 may be removably attached to body 30 as by bolts 38 extending through cover 37 and into threaded holes 39 in body 30. Cover 37 serves to confine the cable 11 in recess 36.

Although each former 21, 22 and 23 may be provided with a cover 37, such is shown as not being provided for third former 23 as it has been found that a cover 37 for former 23 may not be necessary.

Figure 6:
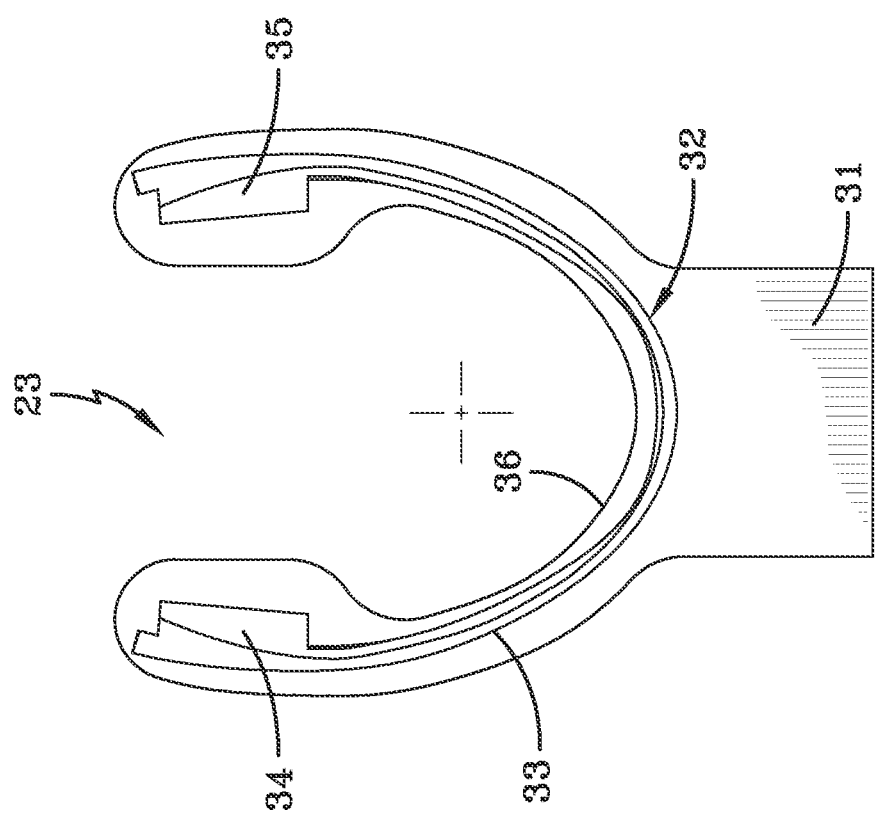
FIG. 6 is an elevational view of the third former which receives the sleeve.

Thus formers 21, 22 and 23 are generally identical except for the configuration of the arcuate portion 33. As will hereinafter become evident, the arcuate portion 33 of former 21 (FIG. 4) has a larger radius of curvature than the arcuate portion 33 of former 22 (FIG. 5) which, in turn, has a larger radius of curate than the arcuate portion 33 of former 23 (FIG. 6).

Device 10 also includes a sleeve attachment portion generally indicated by the numeral 40 and positioned adjacent to third former 23. Attachment portion 40 is carried by post 17 and to that end includes a plate 41 which may be welded or otherwise attached to post 17. A pivotable plate 42 is carried by plate 41 by means of a threaded pivot pin 43 which extends through a hole 44 in plate 41 and through a hole 45 in plate 42 to be engaged by a wing nut 46. Another pin 47 extends through a hole 48 in plate 41 and through an adjustment slot 49 in plate 42 to be engaged by a wing nut 50. As such, by loosening wing nut 50, pin 47 may be moved in slot 49 to a desired position to adjust the angular position of plate 42, and all of the components attached to plate 42, now to be described, relative to post 17.

Figure 3:
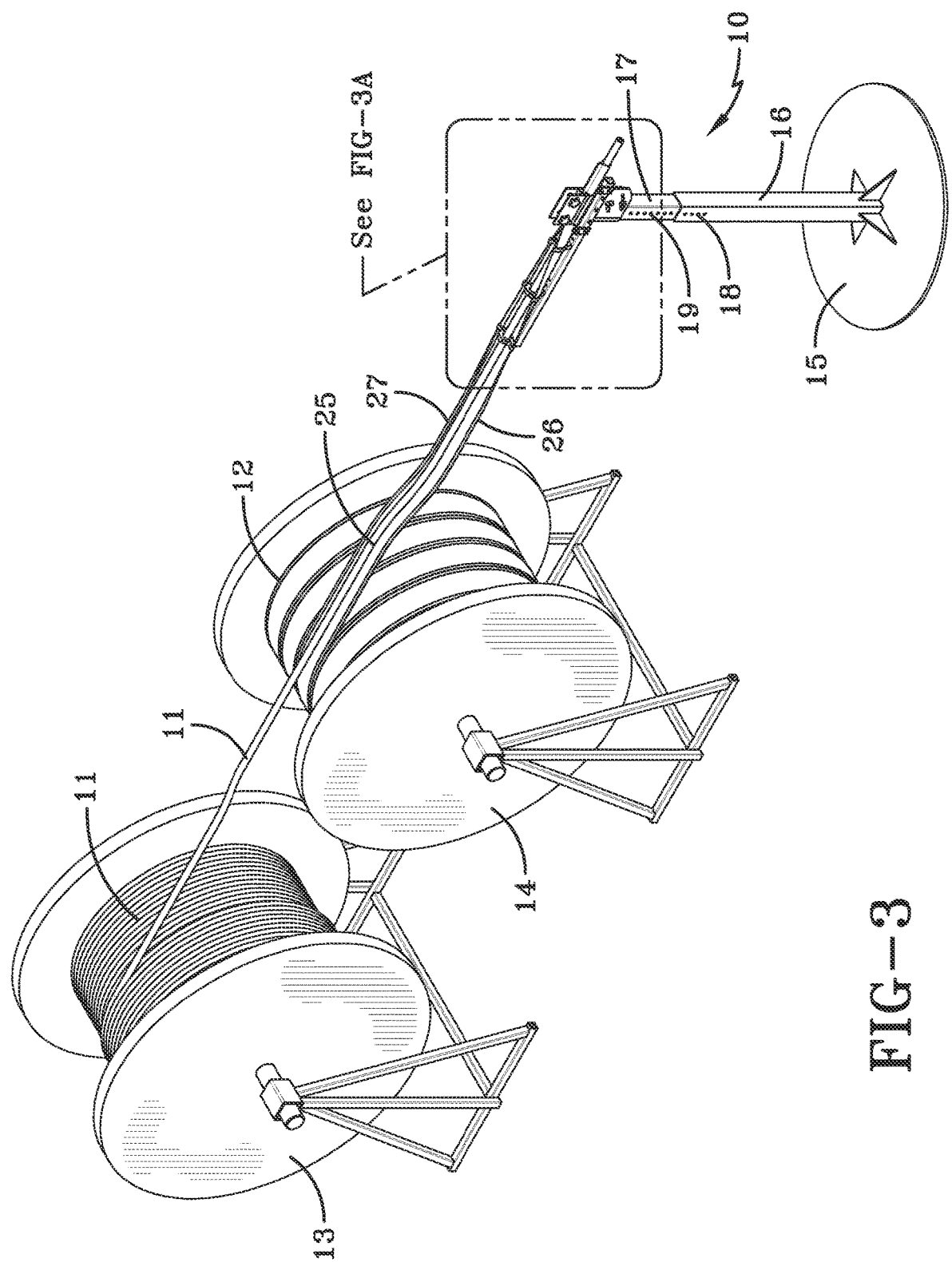
FIG. 3 is a view similar to FIG. 2 but showing the cable positioned in the device.
Figure 3A:
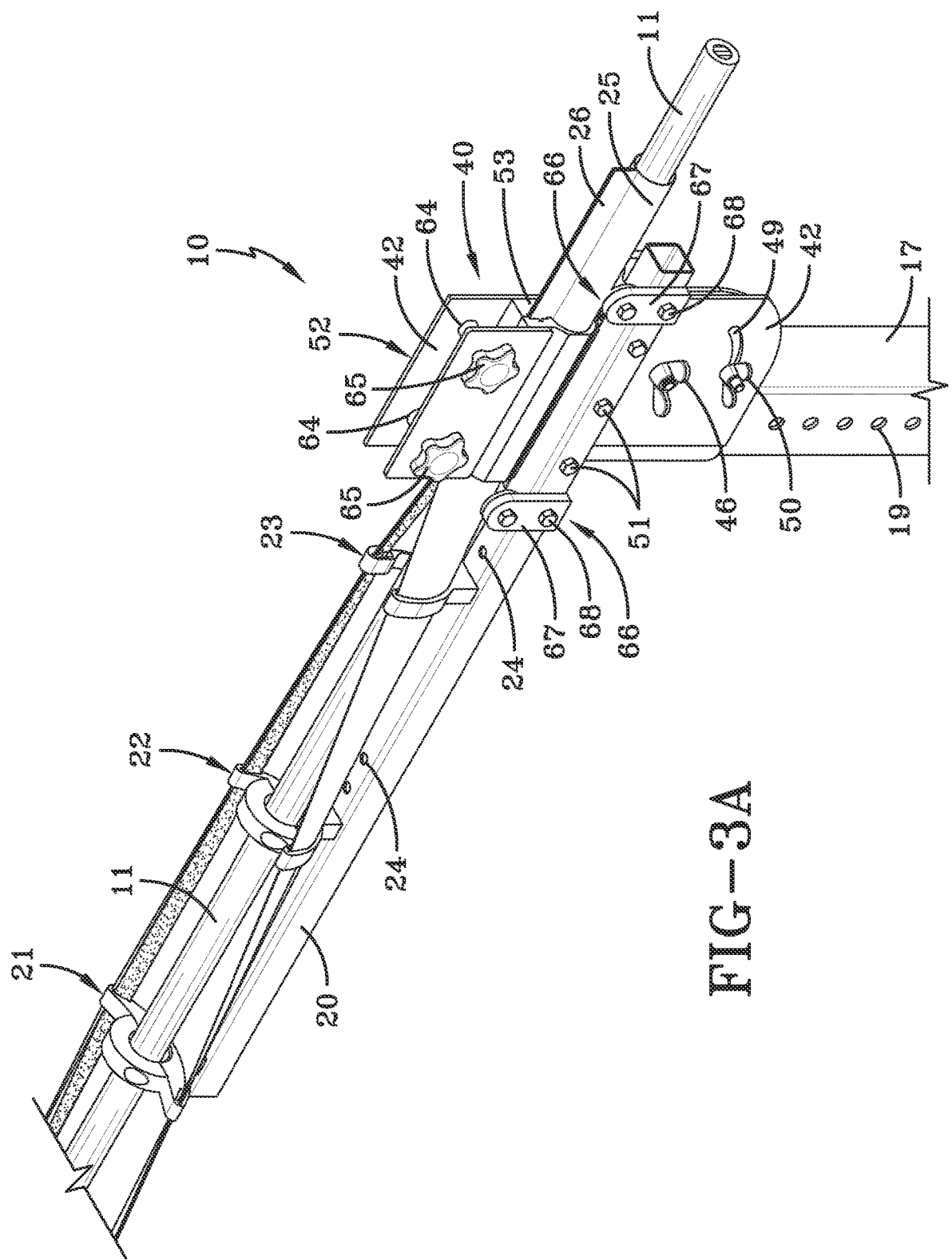
FIG. 3A is a fragmented, enlarged view of the device encircled in FIG. 3.
Figure 7:
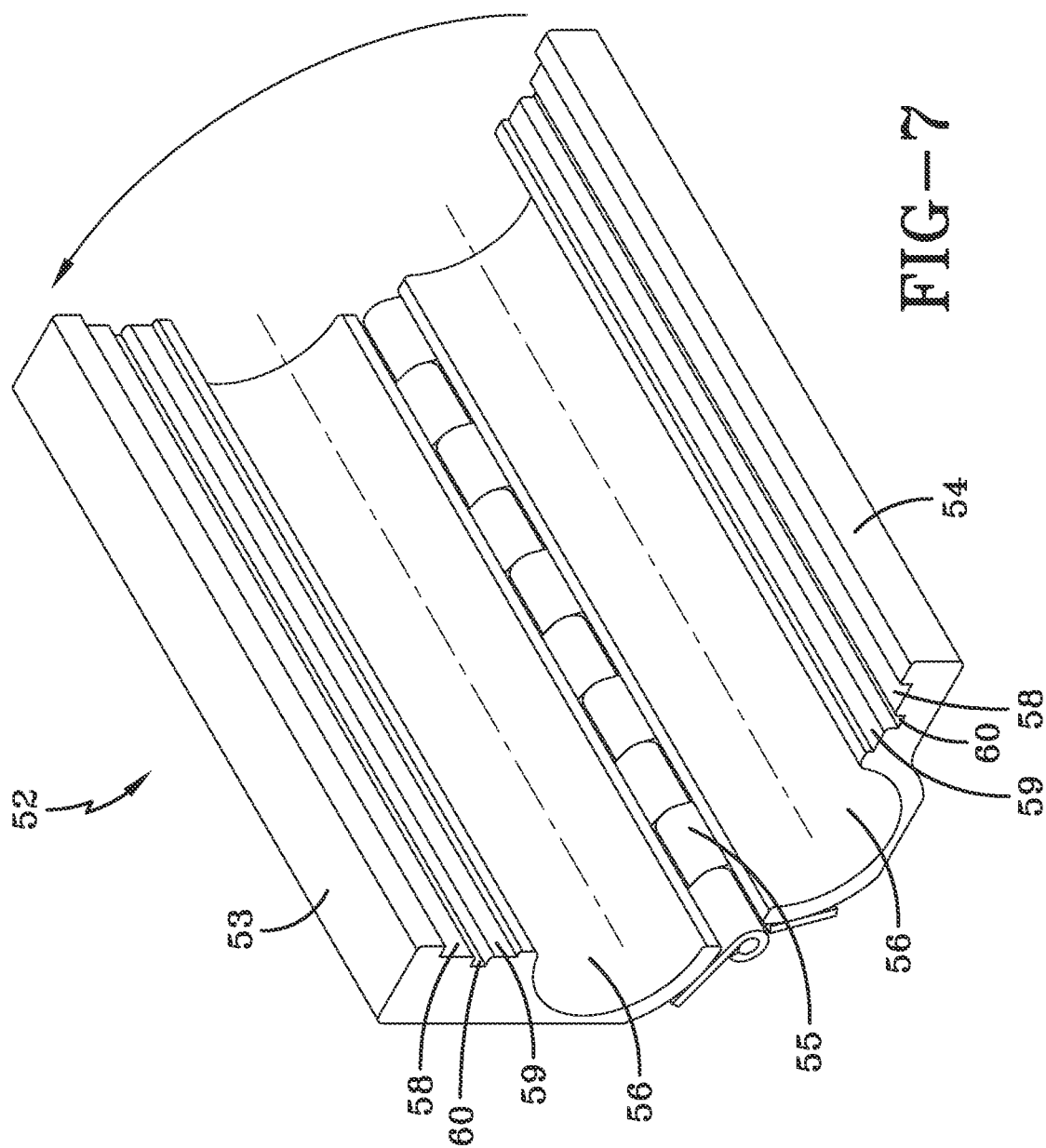
FIG. 7 is a perspective view of a portion of the attachment assembly shown in an open position.

Plate 42 is attached to beam 20 by a plurality of bolts 51 as shown in FIG. 3A. Plate 42 also carries an attachment unit generally indicated by the numeral 52 and best shown in FIGS. 7 and 8. Attachment unit 52 is formed by two plates 53 and 54 joined by a hinge 55. Each plate 53, 54 is provided with a semicircular recess 56 which, when plates 53 and 54 are closed against each other, form an aperture 57 approximately the size of the cable 11 with the sleeve 12 on it.

Figure 8:
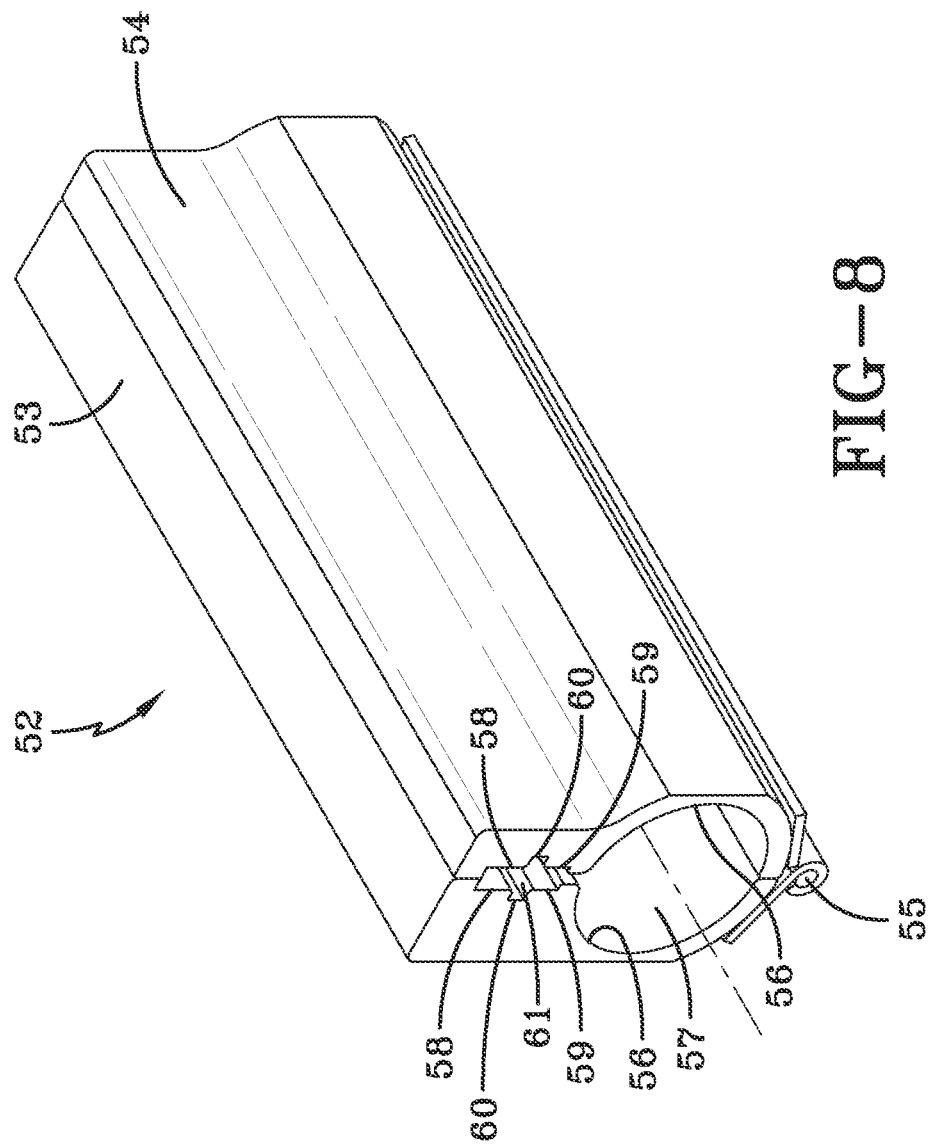
FIG. 8 is a perspective view with the position of the attachment assembly shown in FIG. 7 in a closed position.
Figure 9:
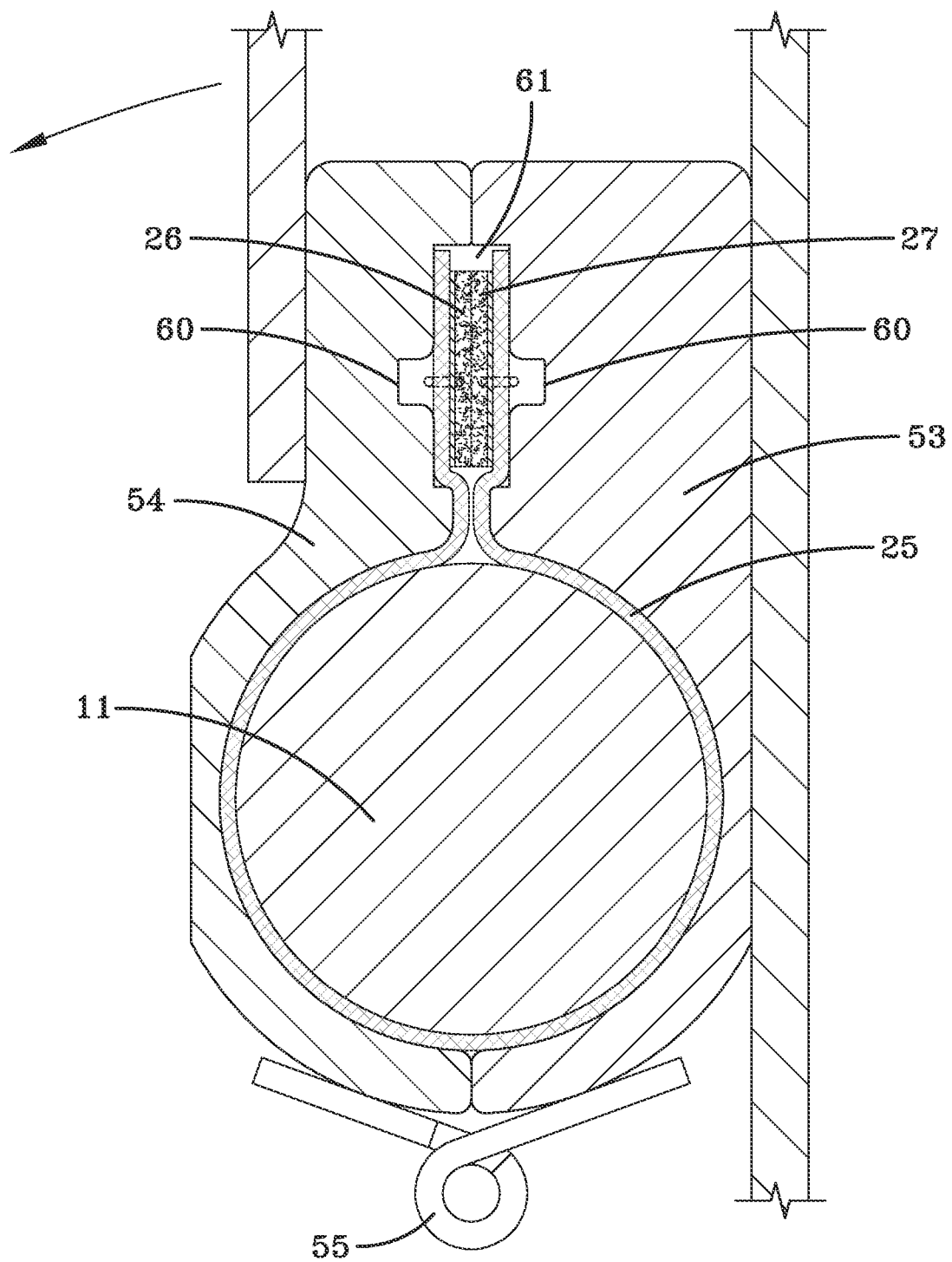
FIG. 9 is an end view of that which is shown in FIG. 8 and schematically showing the cable and showing the sleeve positioned thereon.

Each plate 53, 54 is provided with a first channel 58, a second channel 59, and a third deeper channel 60 located between channels 58 and 59. When plates 53 and 54 are positioned together as shown in FIG. 8, a recess 61 is formed. As will hereinafter become evident, recess 61 receives and attaches the attachment members 26 and 27 with the opposed deeper channels 60 forming a space for the stitching that attaches the members 26 and 27 to the strip of material 25.

Plate 53 is attached to plate 42 by being welded or the like. As shown, for example in FIG. 1B, plate 54 carries, as by welding, a flap 62. Flap 62 is provided with two pins 63 which are aligned with threaded lugs 64 on plate 42, and flap 62 may be attached to plate 42 to hold plates 53 and 54 together on their hinge 55 by knob screws 65.

The cable 11 and sleeve 12 may be guided into and out of attachment portion 40 by roller assembles generally indicated by the numeral 66. Each roller assembly 66 includes brackets 67 having one end attached to beam 20 as by bolts 68. The other end is journaled so as to have a busing or roller 69 carried thereby. As such, as the cable and sleeve combination travel through device 10, rollers 69 can ease and align the entry and exit from attachment portion 40, as may be necessary.

The operation of device 10 will now be described in detail. The device 10, as well as the reel 13 of cable 11 and reel 14 of sleeve 12, are positioned at a cable installation site such as a manhole or the like. The height of device 10 and the angular orientation of the attachment unit 52 may be adjusted, as previously described, as may be necessary for ease of entry into the conduit, the access to which has been gained in the manhole.

Figure 1A:
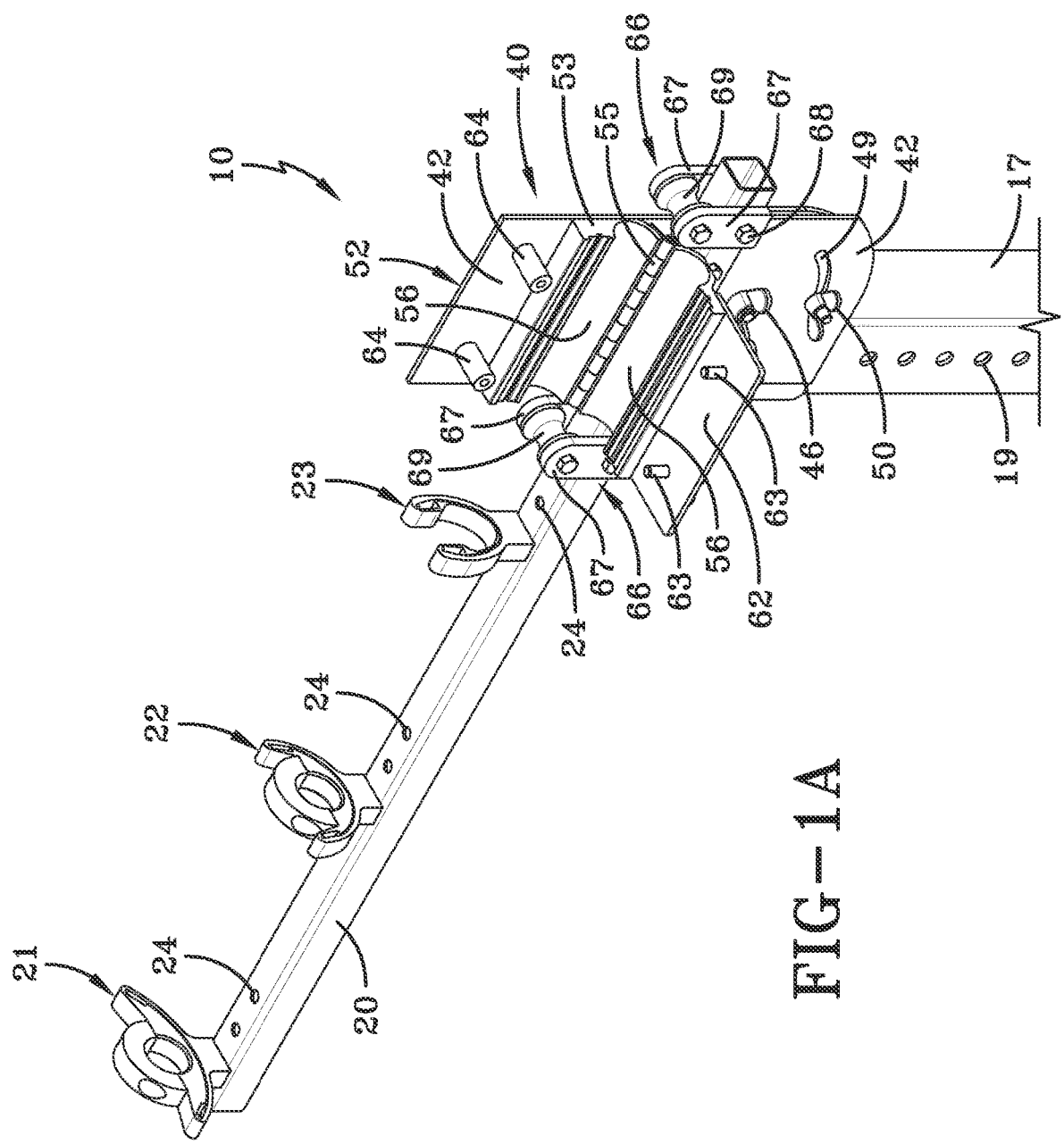
FIG. 1A is a fragmented, enlarged view of the device encircled in FIG. 1.
Figure 1B:
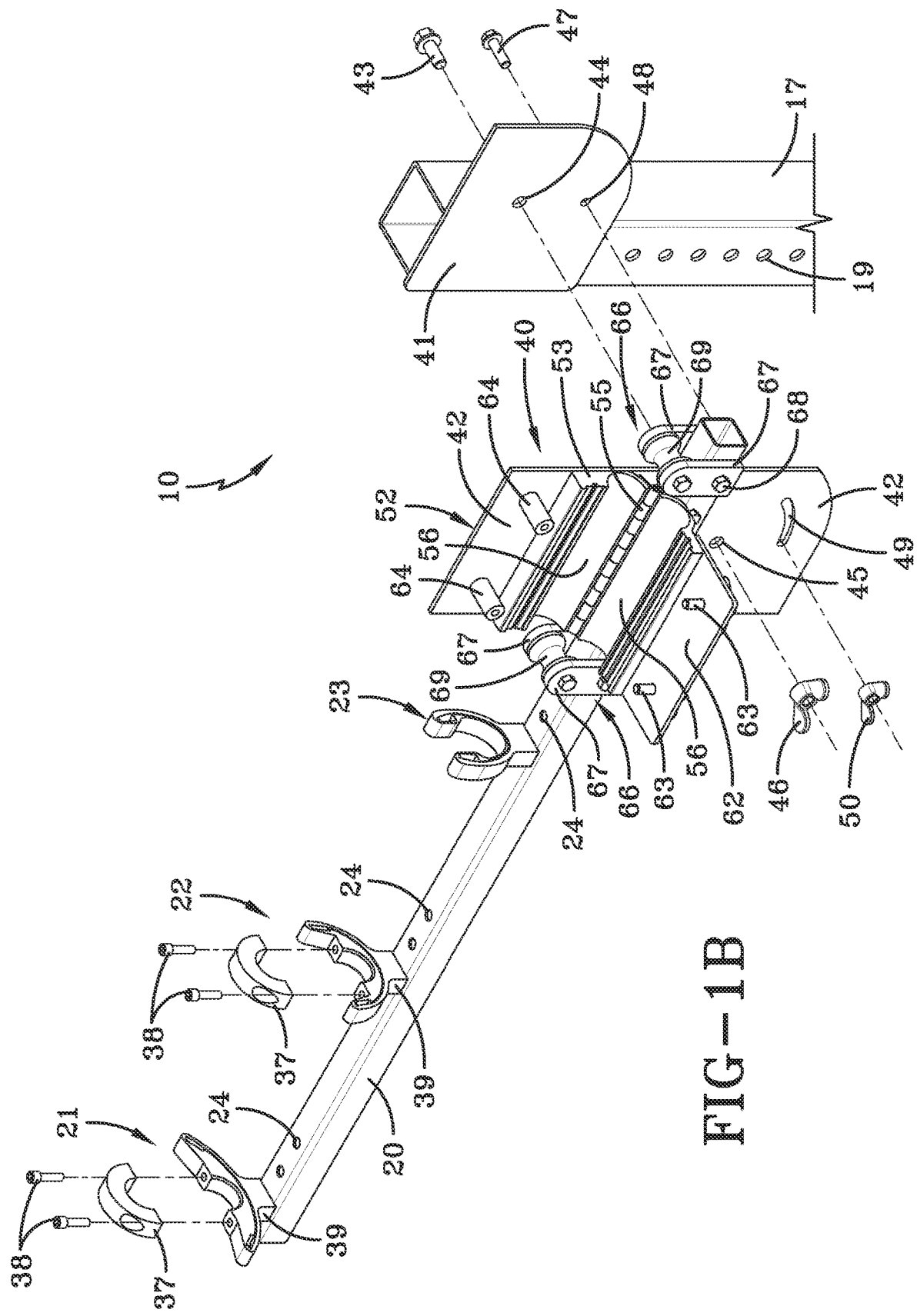
FIG. 1B is similar to FIG. 1A but with components of the device being shown in an exploded form.
Figure 2:
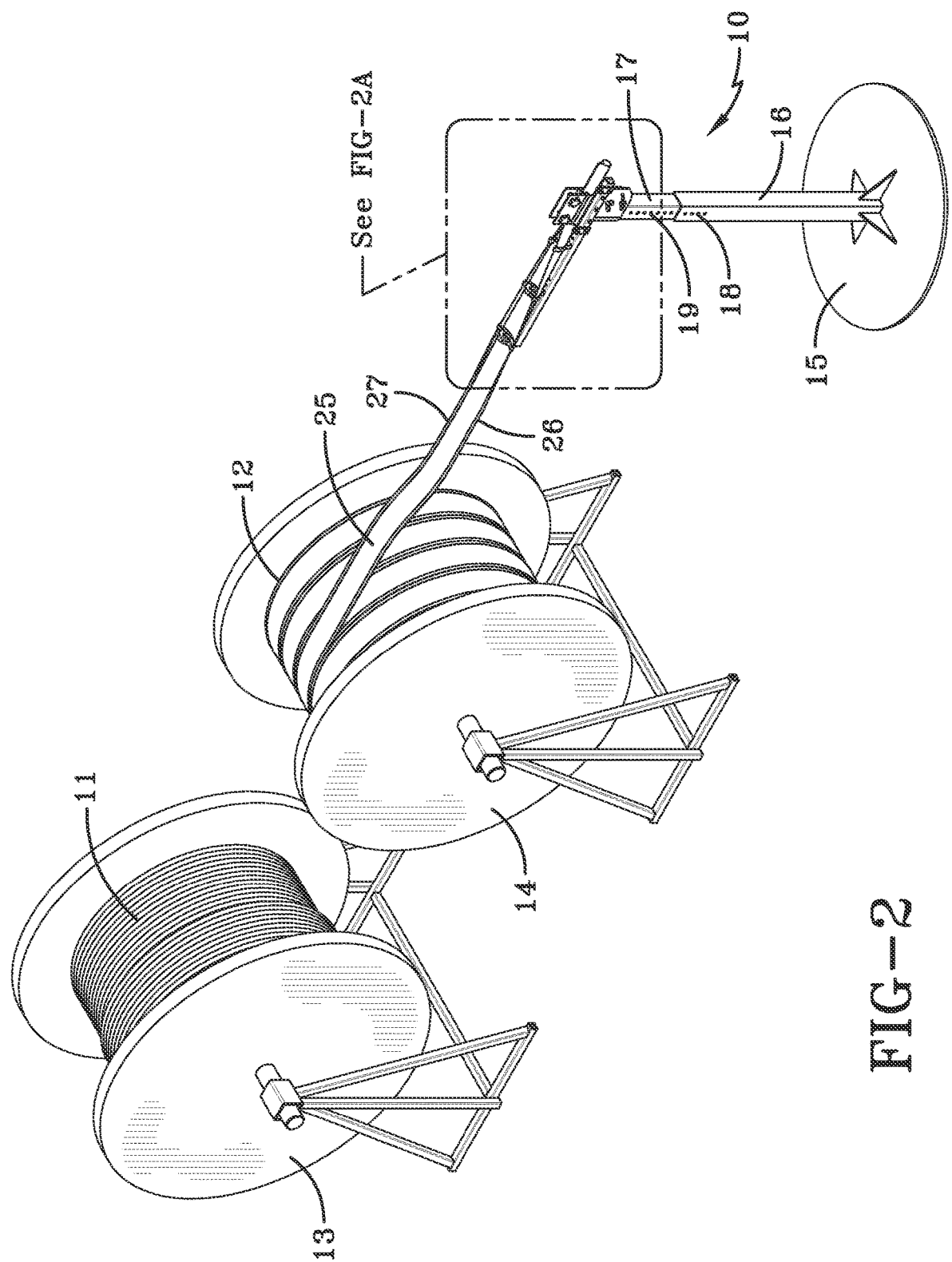
FIG. 2 is a view similar to FIG. 1 but showing the sleeve positioned in the device.
Figure 2A:
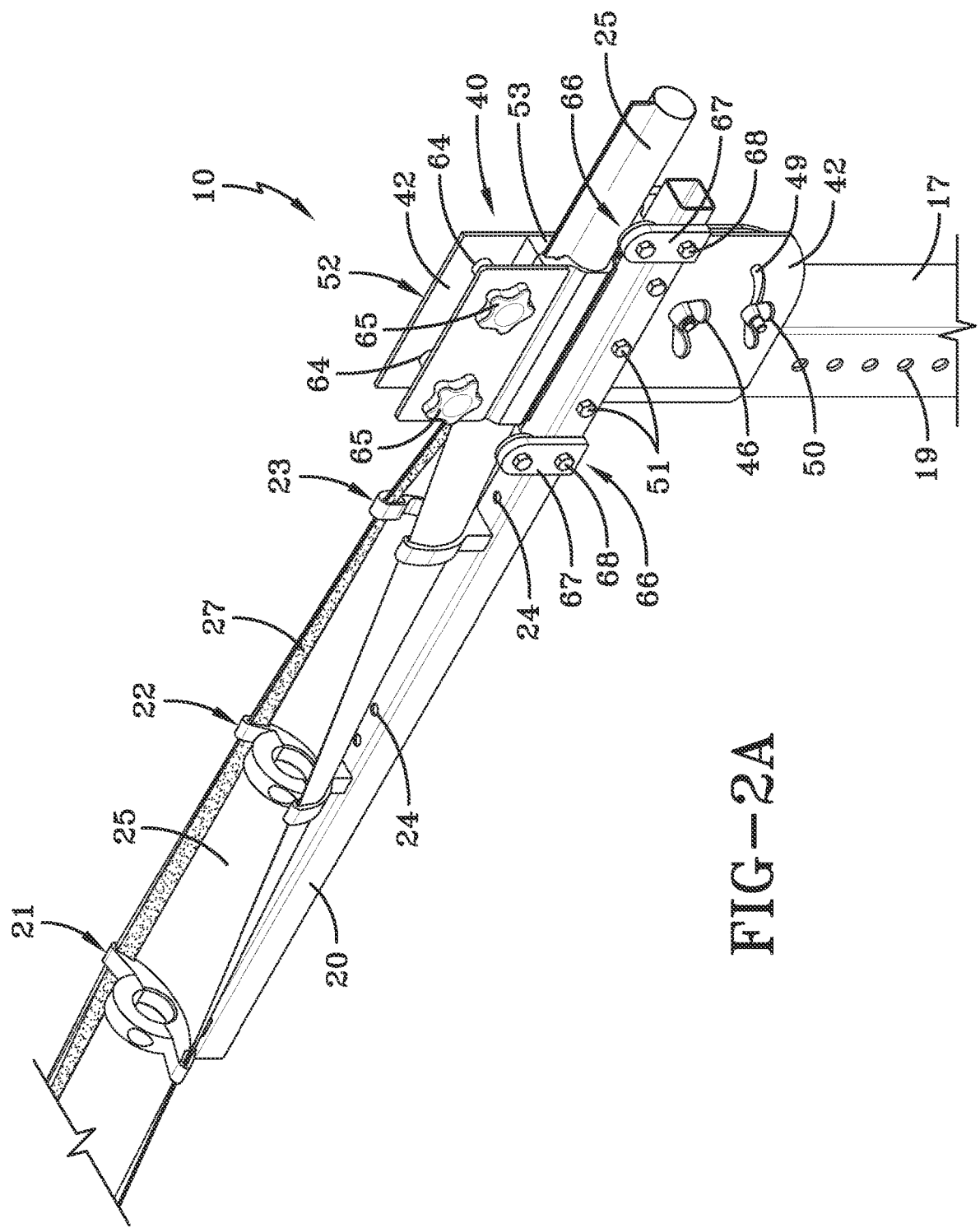
FIG. 2A is a fragmented, enlarged view of the device encircled in FIG. 2.

With the attachment unit 52 open, as shown in FIG. 1A, the sleeve is threaded through the arcuate portions 33 of slots 32 of formers 21, 22 and 23. Because of the decreasing radii of curvature of arcuate positions 33, sleeve begins a sequence of folding around a cable 11, as shown in FIG. 2A, and once the attachment unit 52 is closed, the attachment members, which have been received in portions 34 and 35 of slots 32, engage each other. The cable 11 is also fed into the device 10 onto the recess 36 in each former body 30 and beneath covers 37 as shown in FIG. 3A.

A pull rope or tape is typically already positioned in the conduit, and it is attached to the exposed end of the cable 11 and sleeve 12 shown in FIG. 3. A pulling device is located at another access point, such as another of a plurality of manholes, downstream of the location of device 10. Once attached, the pulling device is activated to automatically pull cable 11 off of reel 13 and sleeve off of reel 14 and through device 10 which automatically wraps the sleeve 12 around the cable which is then continuously moved through the conduit.

When the sleeved cable reaches the next downstream location, the attachment unit 52 is opened on hinge 55, caps 37 are taken off the formers 21 and 22, and the sleeved cable may be removed from the device. At that time the sleeve can be cut from around the "rear" end of the cable that has been pulled to the next downstream location. Then, the device 10 and the sleeve roll are moved to the next downstream location and the exposed end of the cable, as it is shown in FIG. 3A is at the downstream location, and the cable can be slid through the sleeve until enough cable is exposed to be received again in device 10 with a new supply of sleeve. The expanse of sleeve between the two manholes stays in place as the new supply of sleeve is applied to the bare cable that is being pulled into the next conduit section. This process is continued, from manhole to manhole, until the desired length of cable has been covered with the sleeve.

In view of the foregoing, it should be evident that a device constructed as described accomplishes the objects of the invention as substantially improves the art.

What is claimed is:

1. An apparatus for applying a sleeve around a cable, the sleeve being in the form of a strip of material having compatible attachment members positioned along its lateral edges of the strip of material, the apparatus comprising a post, a beam carried by said post, a plurality of formers carried at longitudinally spaced locations along said beam, said formers receiving the cable and the sleeve and folding the sleeve around the cable, and an attachment device carried by said beam, said attachment device receiving the sleeve and the cable from said formers and connecting the attachment members so that the attachment members extend outward from the cable and so that the sleeve is applied to the cable without the sleeve being attached to the cable.

2. The apparatus of claim 1, each said former having an arcuate slot to receive the sleeve, a radius of curvature of said slots varying from former to former so that the sleeve progressively surrounds the cable.

3. The apparatus of claim 2, wherein each said arcuate slot has enlarged ends to receive the attachment members.

4. The apparatus of claim 1 further comprising a roller carried by said beam between said formers and said attachment device.

5. The apparatus of claim 1 further comprising a second roller carried by said beam and adapted to receive the cable and sleeve from the attachment device.

6. The apparatus of claim 1, further comprising means to rotate said attachment device relative to said post.

7. An apparatus for applying a sleeve around a cable, the sleeve being in the form of a strip of material having compatible attachment members positioned along its lateral edges of the strip of material, the apparatus comprising a post, a beam carried by said post, a plurality of formers carried at longitudinally spaced locations along said beam, each said former having an arcuate slot to receive the sleeve, a radius of curvature of said slots varying from former to former so that the sleeve progressively surrounds the cable, and each said former having an arcuate recess above said slot, said recess being adapted to receive the cable, and an attachment device carried by said beam, said attachment device receiving the sleeve and the cable from said formers and connecting the attachment members so that the sleeve is applied to the cable without the sleeve being attached to the cable.

8. The apparatus of claim 7 further comprising a cover removably positioned over said recess of said formers to confine the cable in said recess.

9. An apparatus for applying a sleeve around a cable, the sleeve being in the form of a strip of material having compatible attachment members positioned along its lateral edges of the strip of material, the apparatus comprising a height adjustable post, a beam carried by said post, a plurality of formers carried at longitudinally spaced locations along said beam, said formers receiving the cable and the sleeve and folding the sleeve around the cable, and an attachment device carried by said beam, said attachment device receiving the sleeve and the cable from said formers and connecting the attachment members so that the sleeve is applied to the cable without the sleeve being attached to the cable.

10. An apparatus of for applying a sleeve around a cable, the sleeve being in the form of a strip of material having compatible attachment members positioned along lateral edges of the strip of material, the apparatus comprising a post, a beam carried by said post, a plurality of formers carried at spaced locations along said beam, said formers receiving the cable and the sleeve and folding the sleeve around the cable, and a an attachment device carried by said beam, said attachment device receiving the sleeve and the cable from said formers and connecting the attachment members so that the sleeve is applied to the cable, wherein said attachment device includes a first plate and a second plate with a hinge between said first and second plates which allows said first and second plates to rotate relative to each other from a closed position with the first and second plates being adjacent to each other to an open position.

11. The apparatus the claim 10 further comprising means to attach said first and second plates wherein the closed position.

12. The apparatus of claim 10, each said first and second plate having a recess such that when in the closed position, the recesses form an aperture for the cable.

13. The apparatus of claim 10, wherein each said first and second plate includes at least one channel such that when in the closed position, the channels form a recess for, and attaches, the attachment members.

* * * * *